United States Patent
Gady et al.

(10) Patent No.: US 7,322,436 B2
(45) Date of Patent: Jan. 29, 2008

(54) AUTOMATIC AXLE TRACTION CONTROL

(75) Inventors: Richard E. Gady, Rochester Hills, MI (US); Stephen A. Federighe, Washington, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 675 days.

(21) Appl. No.: 10/666,712

(22) Filed: Sep. 18, 2003

(65) Prior Publication Data
US 2005/0072617 A1  Apr. 7, 2005

Related U.S. Application Data

(62) Division of application No. 09/873,440, filed on Jun. 4, 2001, now Pat. No. 6,644,428.

(51) Int. Cl.
*B60K 28/16* (2006.01)
(52) U.S. Cl. ..................................... 180/197
(58) Field of Classification Search ............ 180/244, 180/247–249, 197; 701/89; 477/36, 39, 477/40, 71, 172, 173
See application file for complete search history.

(56) References Cited

U.S. PATENT DOCUMENTS

| | | | |
|---|---|---|---|
| 4,753,312 A * | 6/1988 | Burgdorf et al. ............ | 180/244 |
| 4,854,413 A | 8/1989 | Kameda | |
| 4,967,869 A * | 11/1990 | Nagaoka et al. ............ | 180/244 |
| 5,035,158 A | 7/1991 | Leigh-Monstevens | |
| 5,150,637 A | 9/1992 | Ninomiya | |
| 5,184,695 A * | 2/1993 | Matsuda et al. ............ | 180/244 |
| 5,215,160 A | 6/1993 | Williams | |
| 5,275,252 A | 1/1994 | Sperduti | |
| 5,275,253 A | 1/1994 | Sperduti | |
| 5,335,764 A | 8/1994 | Leitner et al. | |
| 5,407,024 A | 4/1995 | Watson | |

(Continued)

FOREIGN PATENT DOCUMENTS

DE  3527959  2/1987

(Continued)

OTHER PUBLICATIONS

The 43rd L. Ray Buckendale Lecture, "Commerical Vehicle Braking Systems: Air Brakes, ABS and Beyond", Leonard C. Buckman, P.E.—Meritor WABCO, SAE International, 1998.

(Continued)

*Primary Examiner*—Lesley D. Morris
(74) *Attorney, Agent, or Firm*—Carlson, Gaskey & Olds

(57) ABSTRACT

An automatic axle engagement system utilizes wheel speed sensors, engine control, and braking control to provide optimal engagement of a front drive axle to provide all wheel drive under poor driving conditions. The system includes a transfer case that is coupled to a power source and which has output shafts for front and rear drive axles. The engine provides torque to the transfer case via an input shaft. Wheel sensors generate wheel speed signals that are transmitted to a controller, which determined whether or not there is wheel slip. The controller initiates a shift to drivingly engage the front drive axle if there is wheel slippage by controlling one or both of the output torque or axle braking forces to bring rotational speeds of the input shaft and the rear axle output shaft within a predetermined speed range.

21 Claims, 2 Drawing Sheets

U.S. PATENT DOCUMENTS

| | | | |
|---|---|---|---|
| 5,485,894 A | 1/1996 | Watson | |
| 5,522,777 A | 6/1996 | Baxter et al. | |
| 5,609,219 A | 3/1997 | Watson | |
| 5,651,593 A * | 7/1997 | Shitani et al. | 180/244 |
| 5,737,714 A * | 4/1998 | Matsuno et al. | 180/197 |
| 5,771,477 A | 6/1998 | Showalter | |
| 5,850,616 A | 12/1998 | Matsuno | |
| 5,867,092 A | 2/1999 | Vogt | |
| 5,913,377 A | 6/1999 | Ota | |
| 5,927,426 A | 7/1999 | Hall | |
| 5,993,354 A | 11/1999 | Winks | |
| 6,000,488 A | 12/1999 | Atkinson | |
| 6,007,454 A * | 12/1999 | Takahira et al. | 180/197 |
| 6,062,330 A | 5/2000 | Watson | |
| 6,105,703 A * | 8/2000 | Kuroda et al. | 180/248 |
| 6,108,601 A | 8/2000 | Breithor et al. | |
| 6,115,663 A * | 9/2000 | Yasuda | 180/197 |
| 6,186,258 B1 | 2/2001 | Deutschel | |
| 6,193,006 B1 | 2/2001 | Deutschel | |
| 6,360,156 B1 * | 3/2002 | Morganroth et al. | 180/197 |
| 6,386,308 B1 * | 5/2002 | Takahira et al. | 180/248 |

FOREIGN PATENT DOCUMENTS

| | | |
|---|---|---|
| DE | 3636260 | 5/1988 |
| EP | 0 510 457 | 8/1994 |
| EP | 0 885 766 | 8/2000 |

OTHER PUBLICATIONS

English translation of DE 3636260.

* cited by examiner

AUTOMATIC AXLE TRACTION CONTROL

This application is a divisional of 09/873,440 filed on Jun. 4, 2001, now U.S. Pat. No. 6,644,428.

BACKGROUND OF THE INVENTION

This invention relates to a method and apparatus for controlling engine and brake torque to selectively engage a front drive axle to provide all wheel drive under optimal conditions.

Vehicles utilize all wheel drive systems to achieve improved vehicle control under poor road conditions. All wheel drives for trucks equipped with geared front axle clutched transfer cases are normally engaged and disengaged by a vehicle operator or are engaged full time. Engagement systems can be manually controlled by the operator or can be automatically controlled to engage and disengage the front drive axle. Typically automatic control systems utilize electronic controllers that monitor front and rear axle speeds. When the rotational speed of both the front and rear axles are within a certain range, the controller automatically initiates a shift to engage the front axle.

This automatic controlled engagement and disengagement of the front axle is typically initiated independently from the ground conditions. Thus, engagement of the front axle may not be required or may be poorly timed to maintain vehicle tractive effort. Unnecessary engagement of the front axle results in additional wear of the components, which is undesirable. Further, poorly timed shifts can damage transfer case and axle components resulting in vehicle downtime and increased costs for replacement components.

Thus, it is desirable to have an improved control system for axle engagement that takes into account input and output shaft speeds of the transfer case as well as ground conditions to provide optimal axle engagement shifts.

SUMMARY OF THE INVENTION

An all wheel drive system includes a transfer case assembly that transfers driving torque from a vehicle engine to vehicle drive axles. The transfer case assembly includes an input shaft that receives power source output torque, a rear axle output shaft for transferring driving torque from the transfer case assembly to a rear drive axle, and a front axle output shaft that is selectively engaged to a front drive axle under predetermined conditions to achieve all wheel drive. A controller determines the optimal conditions for the engagement and disengagement of the front drive axle.

In the preferred embodiment, the controller determines if there is wheel slippage by monitoring the various wheel speeds of the axles. If there is wheel slippage, the controller determines whether or not the input shaft and the rear axle output shaft are both within a predetermined speed range. If the input shaft and the rear axle output shaft are within the predetermined speed range and there is wheel slip, the controller initiates engagement of the front drive axle. If the input shaft and the rear axle output shaft are not within the predetermined speed range, the controller controls the engine output torque and/or wheel brake torque to bring the input shaft and the rear axle output shaft both within the predetermined rotational speed range.

A typical vehicle drive train includes an internal combustion engine or other power source, transmission, transfer case, front drive axle with wheel brakes, and rear drive axle with wheel brakes. The preferred inventive method for coupling the transfer case to the front drive axle during wheel slip to achieve all wheel drive includes the following steps. The input shaft of the transfer case is coupled to the power source that produces an output torque. The rear drive axle is coupled to a rear output shaft of the transfer case. A sensor system measures wheel speed and the controller determines whether or not there is wheel slip. At least one of the output torque or braking torque is controlled to bring the input shaft and the rear output shaft within the predetermined speed range. The front output shaft of the transfer case is coupled to the front drive axle to achieve all wheel drive when the input shaft and the rear output shaft are within the predetermined speed range.

The subject invention provides an improved control system for axle engagement and disengagement that takes into account input and output shaft speeds of the transfer case as well as ground conditions to provide optimal axle engagement shifts. These and other features of the present invention can be best understood from the following specification and drawings, the following of which is a brief description.

DETAILED DESCRIPTION OF A PREFERRED EMBODIMENT

Figure 1:
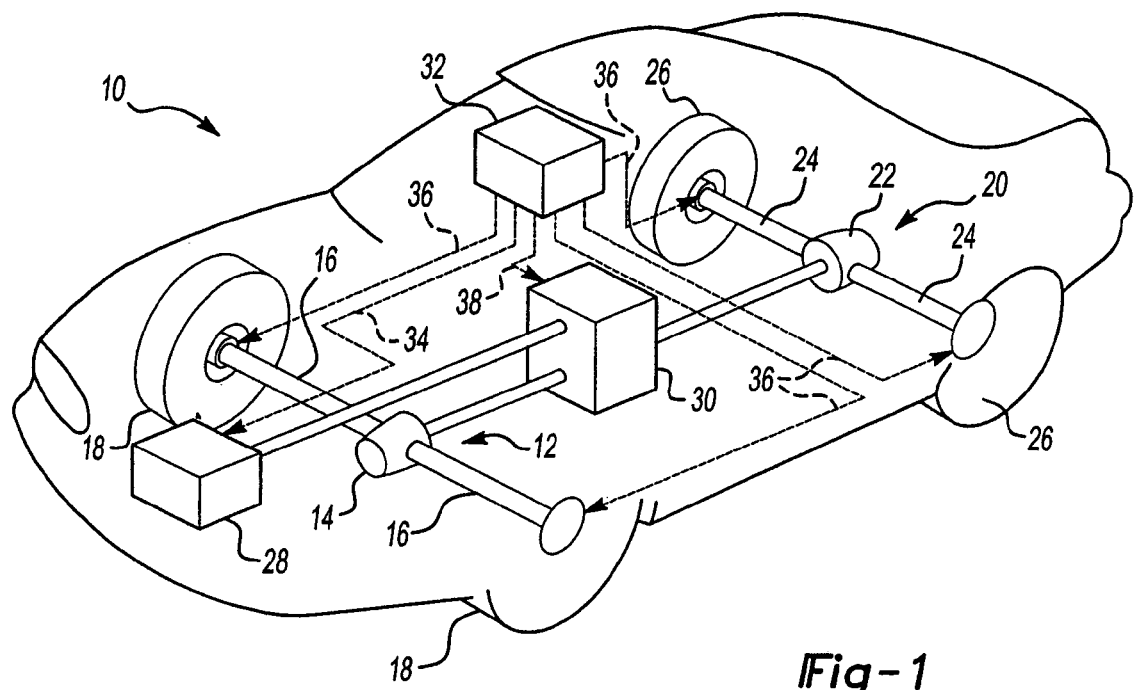
FIG. 1 is a schematic view of a powertrain system incorporating the subject invention.

A typical vehicle powertrain 10 is shown in FIG. 1. The powertrain 10 includes a front drive axle 12 having a center differential 14 for driving a first pair of axle shafts 16, which in turn drive front wheels 18 mounted at opposite ends of the front drive axle 12. The powertrain 10 also includes a rear drive axle 20 with a center differential 22 for driving a second pair of axle shafts 24, which in turn drive rear wheels 26 mounted at opposite ends of the rear drive axle 20.

A power source 28 provides the driving torque to drive the axles 12, 20. A transfer case 30 is used to transfer the driving torque from the power source 28 to the front 12 and rear 20 drive axles. Typically, the rear drive axle 20 is always engaged with the transfer case 30 to provide the vehicle with rear wheel drive. The front drive axle 12 is selectively engagable with the transfer case 30 to provide all wheel drive under predetermined conditions. When ground conditions are poor, such as when there is ice or mud, vehicle control, i.e., tractive effort, is improved when all wheels 18, 26 are provided with driving torque. However, it is undesirable to have all wheel drive when ground conditions are good because all wheel drive adversely affects fuel economy and vehicle maneuverability.

The power source 28 can be any known power source in the art such as an internal combustion engine or electric motor. The power source 28 can also incorporate additional components such as transmissions, power-take-offs, etc.

The subject invention relates to a control system that determines when conditions are optimal to engage and disengage the front drive axle 12. The control system monitors ground conditions and includes a central processor or electronic control unit (ECU) 32 that generates a power source control signal 34 and/or a wheel control signal 36 to provide optimal conditions for axle engagement. The ECU 32 sends a transfer case control signal 38 to initiate shift engagement once the ECU 32 determines that conditions are optimal.

Figure 2:
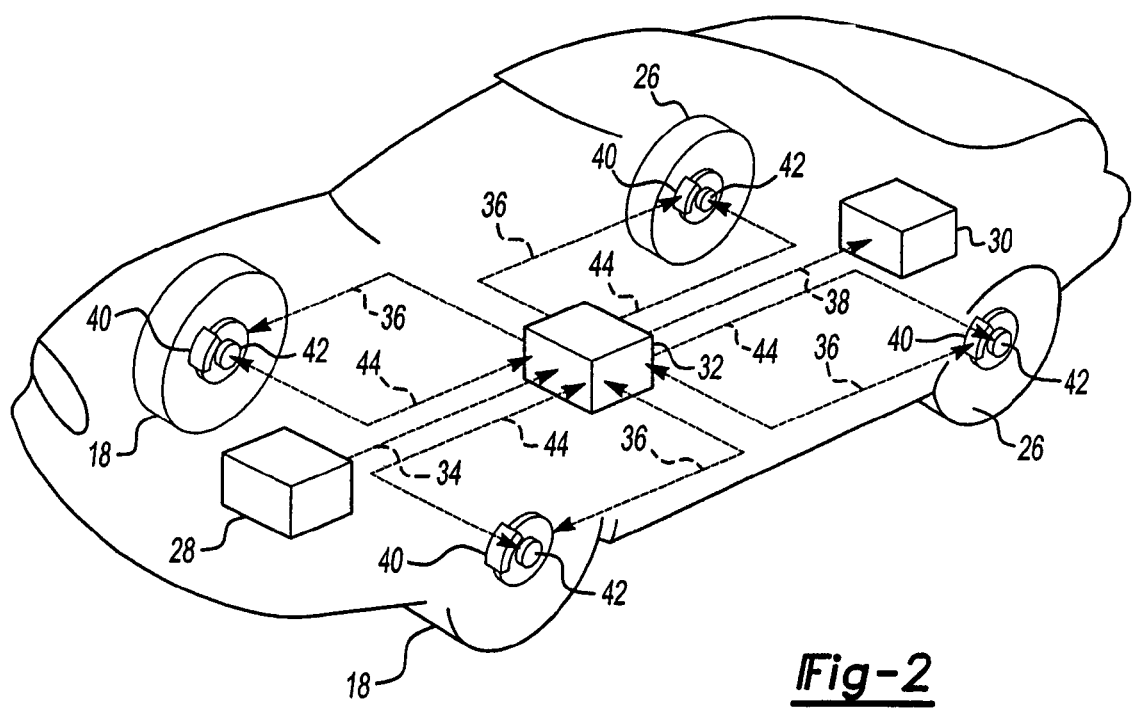
FIG. 2 is a schematic view of a control system for the subject invention.

As shown in FIG. 2, each of the wheels 18, 26 includes a braking mechanism 40 for a brake-by-wire system. Any type of braking mechanism 40 known in the art can be used including dry disc, drum, or wet disc and can be actuated by any known actuation method including hydraulic or pneumatic actuators. Wheel sensors 42 are used to determine wheel speed for each of the wheels 18, 26 and generate wheel speed signals 44 that are transmitted to the ECU 32. By utilizing wheel speed information, the ECU 32 can determine whether or not there is wheel slippage, i.e., poor ground conditions. Once the ECU 32 determines whether or not there is wheel slip the ECU determines whether speed conditions for the transfer case 30 and axles 12, 20 are optimal to initiate a shift. This will be discussed in greater detail below.

Figure 3:
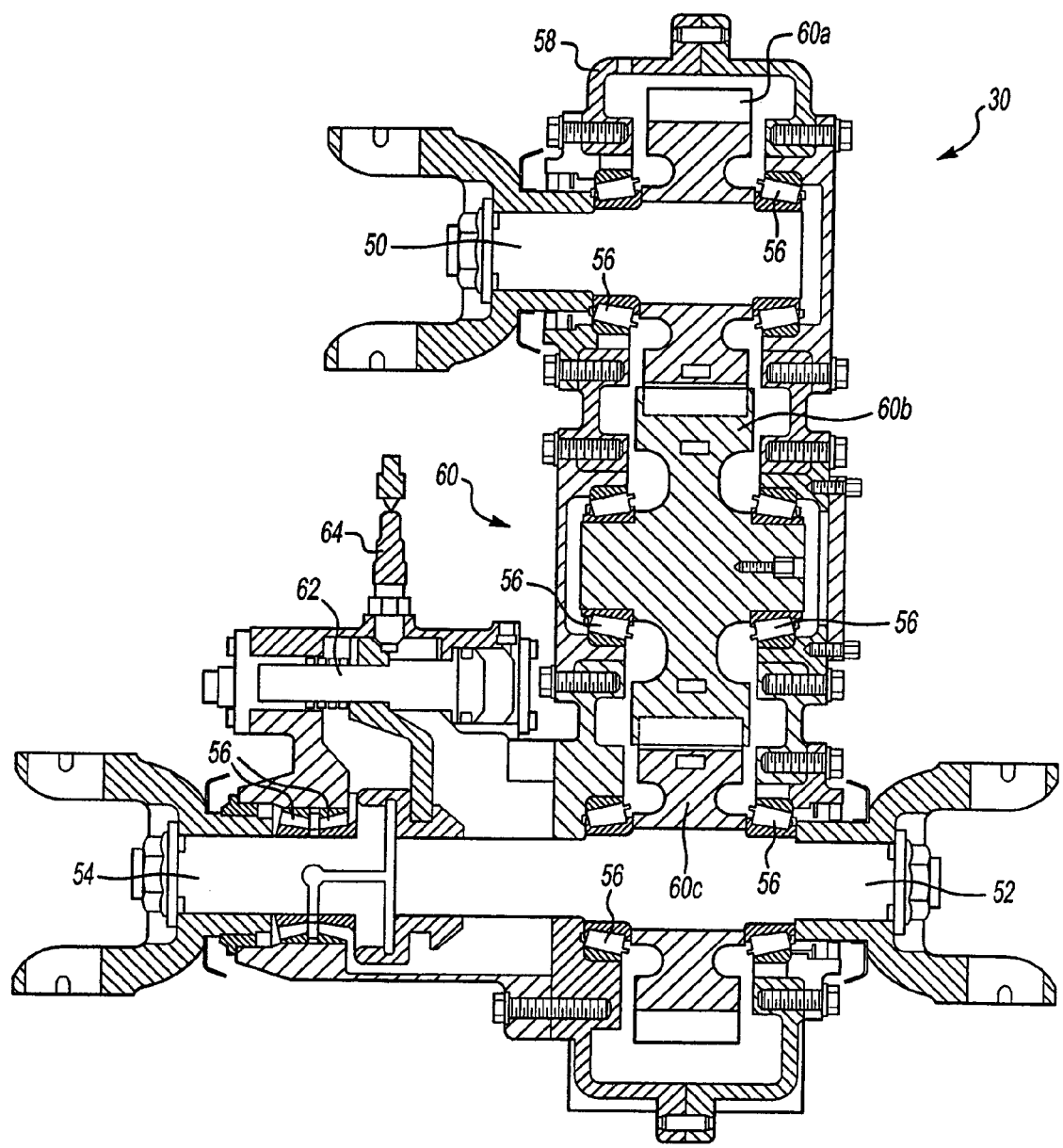
FIG. 3 is a cross-sectional view of a typical transfer case as used with the subject invention.

The transfer case 30 is shown in greater detail in FIG. 3. The transfer case 30 includes an input shaft 50 that couples to the output of the power source 28. The transfer case 30 also includes a rear axle output shaft 52 that is coupled to the rear drive axle 20 and a front axle output shaft 54 that is selectively engaged with the front drive axle 12. The shafts 50, 52, 54 are supported on bearings 56 installed within a housing 58. A gear assembly 60 drivingly connects the input shaft 50 to the rear axle output shaft 52. A first gear 60a is mounted for rotation with the input shaft 50. This first gear meshes with a second gear 60b, which meshes with a third gear 60c mounted for rotation with the rear axle output shaft 52. The gear assembly 60 can provide a 1:1 ratio or can be configured to provide gear reduction if desired.

A declutch mechanism 62 is used to drivingly engage the front axle output shaft 54 to the rear axle output shaft 52 to engage the front drive axle 12. Any known declutch mechanism can be used. The declutch mechanism 62 includes an electrical connector 64 to connect the declutch mechanism 62 to the ECU 32.

In order for the ECU 32 to initiate engagement of the front drive axle 12, the input shaft 50 and rear axle output shaft 52 must both be within a predetermined speed range. If both shafts 50, 52 are within the predetermined speed range the ECU 32 signals the declutch 62 to couple the front axle output shaft 54 to the rear axle output shaft 52 such that the shafts 52, 54 rotate together. Thus, when engaged, the front 54 and rear 52 shafts rotate at the same speed. If the shafts 50, 52 are not within the predetermined range, the ECU 32 initiates various control signals to bring the shafts 50, 52 within the predetermined range.

The control system operates in the following manner. First, the ECU 32 determines if there is wheel slippage by monitoring the various wheel speeds of the axles 12, 20. If there is wheel slippage, the ECU 32 determines whether or not the input shaft 50 and the rear axle output shaft 52 are both within the predetermined speed range. If the input shaft 50 and the rear axle output shaft 52 are within the predetermined speed range and there is wheel slip, the ECU 32 initiates engagement of the front drive axle 12.

If the input shaft 50 and the rear axle output shaft 52 are not within the predetermined speed range, the ECU 32 prevents axle engagement until the shafts 50, 52 are within the predetermined range. The ECU 32 controls the shaft speeds by generating the power source control signal 34 to control the output torque and/or generating the wheel control signal 36 to control wheel brake torque to bring the input shaft 50 and the rear axle output shaft 52 both within the predetermined rotational speed range. The braking torque and power source output torque can be separately controlled or simultaneously controlled depending upon the ground conditions and wheel speeds. For vehicles that do not have brake-by-wire systems, only output torque is controlled. Alternatively, braking torque control can be solely utilized to bring the shafts 50, 52 within the speed range.

When the ground conditions improve, i.e., there is no longer any wheel slip, the ECU 32 signals the transfer case declutch mechanism 62 to disengage from the front drive axle 12. When the axle is engaged, it may be difficult to determine when ground conditions have improved sufficiently. The transfer case could include a spring disengagement mechanism (not shown) or could operate under a time delay to ensure that disengagement does not occur before the desired traction is achieved.

The subject control system for axle engagement and disengagement that takes into account input and output shaft speeds of the transfer case as well as ground conditions to provide optimal axle engagement shifts. The automated control system determines if there is slippage by sensing wheel speeds. If wheel slip is detected, the ECU 32 uses a defined logic matrix to initiate a controlled shift for front axle engagement. This controlled shift forces the front output shaft 54 and the rear output shaft 52 to be within the predetermined range by interrupting power source output torque along with sequencing a controlled wheel brake signal 36. When the speed range requirement is satisfied, the shift is initiated to engage the front axle. Once the axle is engaged, the power source output torque resumes and the brakes 40 are released.

Engine control technology is currently used to provide optimal transmission shifts. Brake control technology is currently used to provide anti-lock braking systems. The subject invention utilizes benefits from both of these technologies to activate axle engagement drives to provide all wheel drive with shift-on-the fly.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A transfer case assembly comprising:
    an input shaft adapted to be coupled to a power source;
    a first axle output shaft driven by said input shaft;
    a second axle output shaft selectively driven by said input shaft;
    a clutch mechanism for coupling said second axle output shaft to said first axle output shaft; and
    a controller for controlling activation of said clutch mechanism wherein said controller compares rotational speeds of said first and second axle output shafts to each other, generates a control signal to bring said rotational speeds of said first and second axle output shafts within a common rotational speed range if rotational speeds of said first and second axle output shafts differ from each other by a predetermined amount, and activates said clutch mechanism to couple said first and second axle output shafts together during a wheel slippage condition when rotational speeds of said first and second axle output shafts are within said common rotational speed range.

2. The transfer case assembly according to claim 1 wherein said controller automatically activates said clutch mechanism during a wheel slippage condition only if rotational speeds of said first and second axle output shafts are within a common rotational speed range.

3. The transfer case assembly according to claim 1 wherein said controller controls at least one of a power source output torque or a wheel braking force to bring rotational speeds of said first and second axle output shafts within said common rotational speed range during the wheel slippage condition.

4. The transfer case assembly according to claim 3 wherein said controller only controls said wheel braking force to bring rotational speeds of said first and second axle output shafts within said common rotational speed range prior to activating said clutch mechanism during the wheel slippage condition.

5. The transfer case assembly according to claim 3 wherein said controller only controls power source output torque to bring rotational speeds of said first and second axle output shafts within said common rotational speed range prior to activating said clutch mechanism during the wheel slippage condition.

6. The transfer case assembly according to claim 3 wherein said controller simultaneously controls both said power source output torque and said wheel braking force to bring rotational speeds of said first and second axle output shafts within said common rotational speed range prior to activating said clutch mechanism during the wheel slippage condition.

7. The transfer case assembly according to claim 1 wherein said controller disengages said second axle output shaft from said first axle output shaft when there is no wheel slippage.

8. The transfer case assembly according to claim 1 including a gear assembly operably coupling said input shaft to said first axle output shaft for continuous driving engagement.

9. The transfer case assembly according to claim 8 wherein said clutch mechanism selectively couples said second axle output shaft for rotation with said first axle output shaft such that said input shaft drives both said first and second axle output shafts via said gear assembly.

10. The transfer case assembly according to claim 9 wherein said gear assembly includes at least a first gear directly coupled to said input shaft, a second gear directly coupled to said first axle output shaft, and a third gear in meshing engagement with said first and second gears to transfer driving input from said input shaft to said first axle output shaft.

11. The transfer case assembly according to claim 1 including a first drive axle with a first differential that receives driving input from said first axle output shaft, said first differential providing driving input to a first set of wheels and including a second drive axle with a second differential that selectively receives driving input from said second axle output shaft, said second differential providing driving input to a second set of wheels wherein said controller determines rotational speeds of said first and second sets of wheels to identify the wheel slippage condition.

12. The transfer case assembly according to claim 1 wherein said second axle output shaft is only coupled to said first axle output shaft during a wheel slippage condition.

13. A method for coupling a transfer case to a drive axle during wheel slippage comprising the steps of:
(a) providing an input shaft adapted to be coupled to a power source, a first axle output shaft driven by the input shaft, a second axle output shaft selectively driven by the input shaft, and a clutch mechanism for coupling the second axle output shaft to the first axle output shaft;
(b) comparing rotational speeds of the first and second axle output shafts to each other;
(c) generating a control signal to bring the rotational speeds of the first and second axle output shafts within a common rotational speed range if the rotational speeds of the first and second axle output shafts are different from each other by a predetermined amount; and
(d) activating the clutch mechanism to couple the first and second axle output shafts together during a wheel slippage condition once the rotational speeds of the first and second axle output shafts are within the common rotational speed range.

14. The method according to claim 13 wherein step (c) further includes the step of controlling at least one of a power source output torque or a wheel braking force to bring rotational speeds of the first and second axle output shafts within the common rotational speed range during the wheel slippage condition.

15. The method according to claim 14 including the step of only controlling wheel braking force to bring rotational speeds of the first and second axle output shafts within the common rotational speed range prior to step (d).

16. The method according to claim 14 including the step of only controlling power source output torque to bring rotational speeds of the first and second axle output shafts within the common rotational speed range prior to step (d).

17. The method according to claim 14 including the step of simultaneously controlling both the power source output torque and the wheel braking force to bring rotational speeds of the first and second axle output shafts within the common rotational speed range prior to step (d).

18. The method according to claim 13 including the step of disengaging the second axle output shaft from the first axle output shaft subsequent to step (d) when there is no wheel slippage.

19. The method according to claim 13 including the step of continuously driving the first axle output shaft with a gear assembly that is driven by the input shaft.

20. The method according to claim 13 including the steps of providing a first drive axle with a first differential that receives driving input from the first axle output shaft and a second drive axle with a second differential that selectively receives driving input from the second axle output shaft; driving a first set of wheels with the first differential; driving a second set of wheels with the second differential; and determining rotational speeds of the first and second sets of wheels to identify the wheel slippage condition for activation of the clutch mechanism during step (d).

21. The method according to claim 20 including driving the second differential with power from the power source only when wheel slippage is identified in at least one of the first and second sets of wheels.

* * * * *